(12) United States Patent
Ohwa (10) Patent No.: US 7,031,014 B2
(45) Date of Patent: Apr. 18, 2006

(54) IMAGE FORMING SYSTEM FOR TANDEM PRINTING AND USER NOTIFICATION

(75) Inventor: Yasushi Ohwa, Machida (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 917 days.

(21) Appl. No.: 09/803,037

(22) Filed: Mar. 12, 2001

(65) Prior Publication Data

US 2002/0126307 A1    Sep. 12, 2002

(51) Int. Cl.
*G06F 3/12*    (2006.01)
*G06F 13/00*    (2006.01)

(52) U.S. Cl. .................................... 358/1.18; 358/1.15
(58) Field of Classification Search ......... 358/1.1–1.18
See application file for complete search history.

(56) References Cited

U.S. PATENT DOCUMENTS 6,771,386 B1 *   8/2004   Kato .......................... 358/1.15
6,856,416 B1 *   2/2005   Danknick ................... 358/1.15

FOREIGN PATENT DOCUMENTS

JP         10-198540 A      7/1998
JP         11-203082 A      7/1999

* cited by examiner

*Primary Examiner*—Douglas Q. Tran
(74) *Attorney, Agent, or Firm*—Foley & Lardner LLP (57) ABSTRACT

When at least one output unit is brought into a printable state, a controller prepares a schedule to assign a tandem print job to another output unit under execution of another job so as to complete the tandem print job within the shortest time period, and causes the output unit to execute the tandem print job according to the schedule. Thus, the tandem print job can be started when at least one output unit is brought into a printable state and completed within the shortest time period.

11 Claims, 9 Drawing Sheets

| Job No. | Job NAME | NUMBER OF COPIES | NUMBER OF PAGES | PROGRESS | ... |
|---|---|---|---|---|---|
| 0 | Job② | 15 | 20 | 3-5 | |
| 1 | | | | | |
| 2 | | | | | |

| USER NAME | CONTACT ADDRESS OR PHONE NUMBER |
|---|---|
| tanaka | tanaka@XX.com |
| ohwa | 030-△△△-☐☐☐☐ |
| ⋮ | ⋮ |

HIGHER PRIORITY JOB IS REQUESTED

SCHEDULE IN WHICH HIGHER PRIORITY JOB INTERRUPTS TANDEM PRINT JOB

TIME IS 2 MINUTES PROLONGED. DO YOU AGREE ?

YES    NO

IMAGE FORMING SYSTEM FOR TANDEM PRINTING AND USER NOTIFICATION

BACKGROUND OF THE INVENTION

In some prior art image forming systems, a plurality of image forming apparatuses (output units) can perform printing by distributing and assigning one print job to these apparatuses. A process of executing one print job using a plurality of image forming apparatuses is called tandem printing. Tandem printing job is intended to execute a print job at high speed, based on its use in a network to which a plurality of image forming apparatuses are connected. Tandem printing is achieved by a controller for controlling an operation state of the entire image forming system or an image forming apparatus serving as a master unit. In the prior art image forming systems, tandem printing starts when all image forming apparatuses necessary for the tandem printing are available (on standby for printing). In other words, tandem printing does not start until all image forming apparatuses necessary for the tandem print become available.

As described above, the prior art image forming systems have a problem in that they cannot start tandem printing unless all apparatuses necessary for the tandem print are available or they cannot start it until all the apparatuses becomes available.

The prior art image forming systems have another problem in that they have neither a function of comprehensively presenting operation states and management information of a plurality of image forming apparatuses to a user nor a means for notifying the user of the current progress of the tandem print, the estimated time of ending the print, and the like.

BRIEF SUMMARY OF THE INVENTION

The present invention has been developed in order to resolve the above problems of the prior art image forming systems. An object of the present invention is to provide an image forming system that starts tandem printing even though all apparatuses for executing the tandem printing are not on standby for printing, thus reducing the overall time required for the tandem printing and improving the efficiency of the tandem printing. Another object of the present invention is to provide an image forming system that notifies a user of the progress of tandem printing to improve user convenience during the execution of the tandem printing.

According to one aspect of the present invention, a control apparatus of an image forming system to which a plurality of image forming apparatuses having an image forming section for forming image data on an image forming medium are connected, comprises a management table for managing an operation state of each of the image forming apparatuses, an interface for receiving a printing request from each of the image forming apparatuses or an external device and transmitting a printing instruction to each of the image forming apparatuses, and a controller for, when a printing request for a tandem print job capable of printing using the plurality of image forming apparatuses is received from the image forming apparatuses or the external device through the interface, preparing a schedule in which the tandem print job is distributed and assigned to the plurality of image forming apparatuses based on the operation state of each of the image forming apparatuses, and transmitting a content of the printing that is executed by each of the image forming apparatuses according to the schedule.

According to another aspect of the present invention, a method of controlling an image forming system to which a plurality of image forming apparatuses having an image forming section for forming image data on an image forming medium are connected, comprises a step of preparing a schedule in which a tandem print job capable of printing using the plurality of image forming apparatuses is distributed and assigned to the plurality of image forming apparatuses based on an operation state of each of the image forming apparatuses when a printing request for the tandem print job is received from the image forming apparatuses or an external device, and a step of transmitting a content of the printing to be executed by each of the image forming apparatuses based on the schedule, to each of the image forming apparatuses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described in detail with reference to the accompanying drawings.

Figure 1:
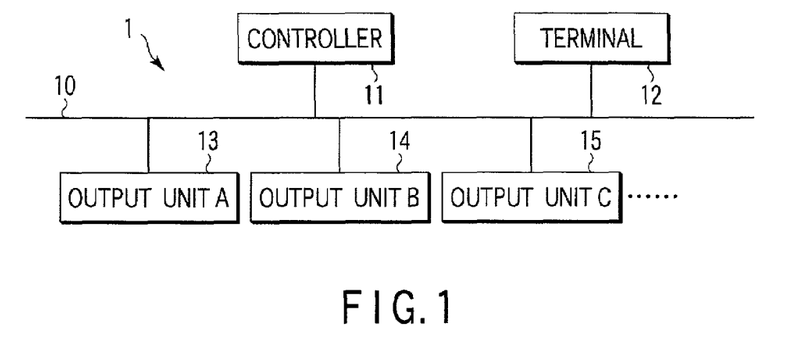
FIG. 1 is a block diagram showing an example of the configuration of an image forming system.

FIG. 1 is a block diagram showing an example of the configuration of an image forming system 1.

As shown in FIG. 1, the image forming system 1 includes a controller (control apparatus unit) 11, a terminal (external device equipment) 12, and a plurality of output units (output units A13, output unit B14 and output unit C15) each serving as an image forming apparatus, which are connected to one another via a network 10.

The network 10 is constructed by network lines or radio communications to allow communications of image data, control data, and the like. The controller 11 functions as a server of the network. The controller 11 transmits/receives data, such as image data and control data, to/from the terminal 12 or the output unit A13 (output unit B14 and output unit C15). The terminal 12 is constituted of a personal computer or the like. The output unit A13 (output unit B14 and output unit C15) is designed to print an image and constituted of, e.g., a digital copying machine.

The process executed by the image forming system is controlled in units of job by the controller 11. The printing process executed by the output units A, B and C is managed as a print job. The print job corresponds to the contents of printing. The printing contents include the number of pages for images to be printed and the number of copies to be printed. The print job includes a single print job and a tandem print job. In the single print job, one print job is executed by any one of the output units of the image forming system. In the tandem print job, one print job is distributed to the plurality of output units to complete the one print job.

Figure 2:
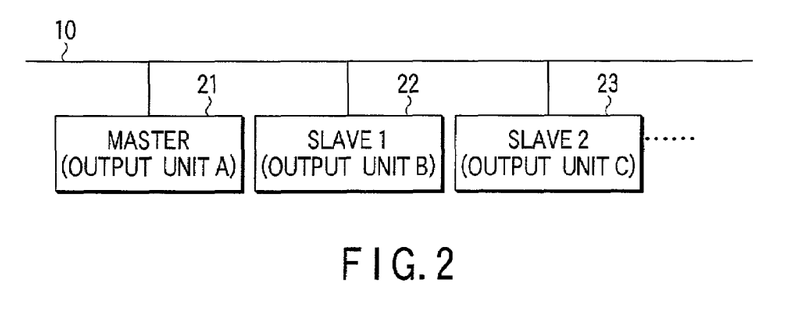
FIG. 2 is a block diagram showing another example of the configuration of the image forming system in which one output unit (image forming apparatus) also serves as a controller.

FIG. 2 is a block diagram showing another example of the configuration of the image forming system. In the example shown in FIG. 2, a plurality of output units (image forming apparatuses) 21, 22 and 23 are connected via a network. One of the output units is used as a master unit, while the other output units are used as slave units. Since the master unit has the same function as that of the controller 11, it performs its printing operation and controls the slave units.

In the example shown in FIG. 2, the output unit A21 serves as a master unit and the output units B22 and C23 serve as slave units. Thus, the output unit A21 performs its printing operation as a single master unit on the network and controls the slave units B22 and C23.

Figure 3:
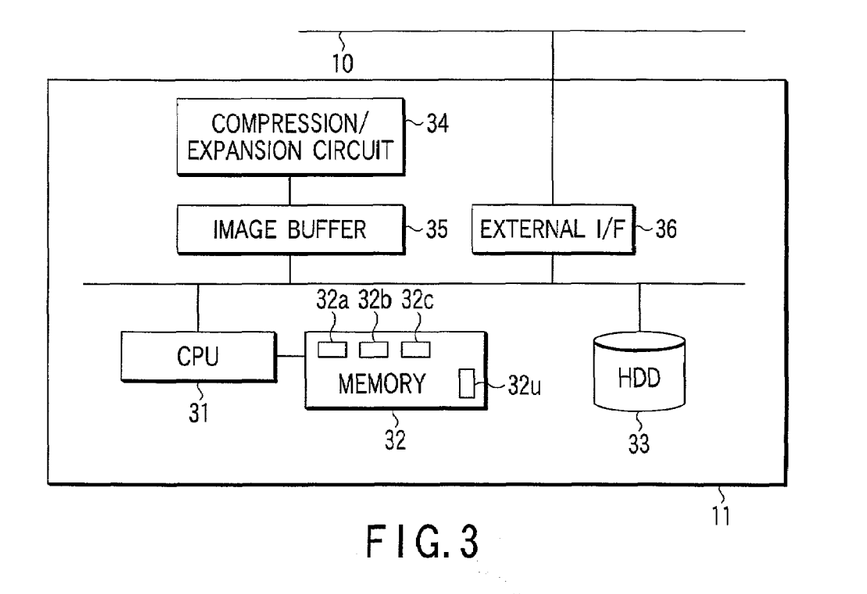
FIG. 3 is a schematic block diagram showing a controller (control unit) of the image forming system.

FIG. 3 is a schematic block diagram of the structure of the controller 11. As FIG. 3 shows, the controller 11 includes a CPU (controller) 31, a memory 32, a hard disk drive (HDD) 33, a compression/expansion circuit 34, an image buffer 35, and an external I/F 36.

The CPU 31 controls the whole of the controller 11. The memory 32 stores control programs and various types of control data of the controller 11. More specifically, the memory 32 stores information indicating an originator that issues a request to print based on a print job. The memory 32 also stores the setting of the priority of a print job and an interrupt of a print job as setting information preset by a user.

The memory 32 has job management tables 32a, 32b and 32c for managing an operation state of each of the output units. These job management tables manage a print job under execution or a print job in a wait state as an operation state of each output unit. The memory 32 also has a user information table 32u for storing user information. The table 32u stores an address or a phone number corresponding to a user name.

The HDD 33 serves as a storage device for storing various types of data such as image data to be printed. The compression/expansion circuit 34 compresses/expands image data. When image data is stored in the HDD 33, the circuit 34 compresses it. When the compressed image data is read out of the HDD 33, the circuit 34 expands it. The image buffer 35 is a memory for storing data temporarily. When image data is transmitted/received to/from another device on the network 10, the image buffer 35 stores the image data temporarily. The external I/F 36 is an interface for connecting the controller 11 with the network 10. The external I/F 36 allows the controller 11 to perform data communications with another device connected to the network 10.

Figure 4:
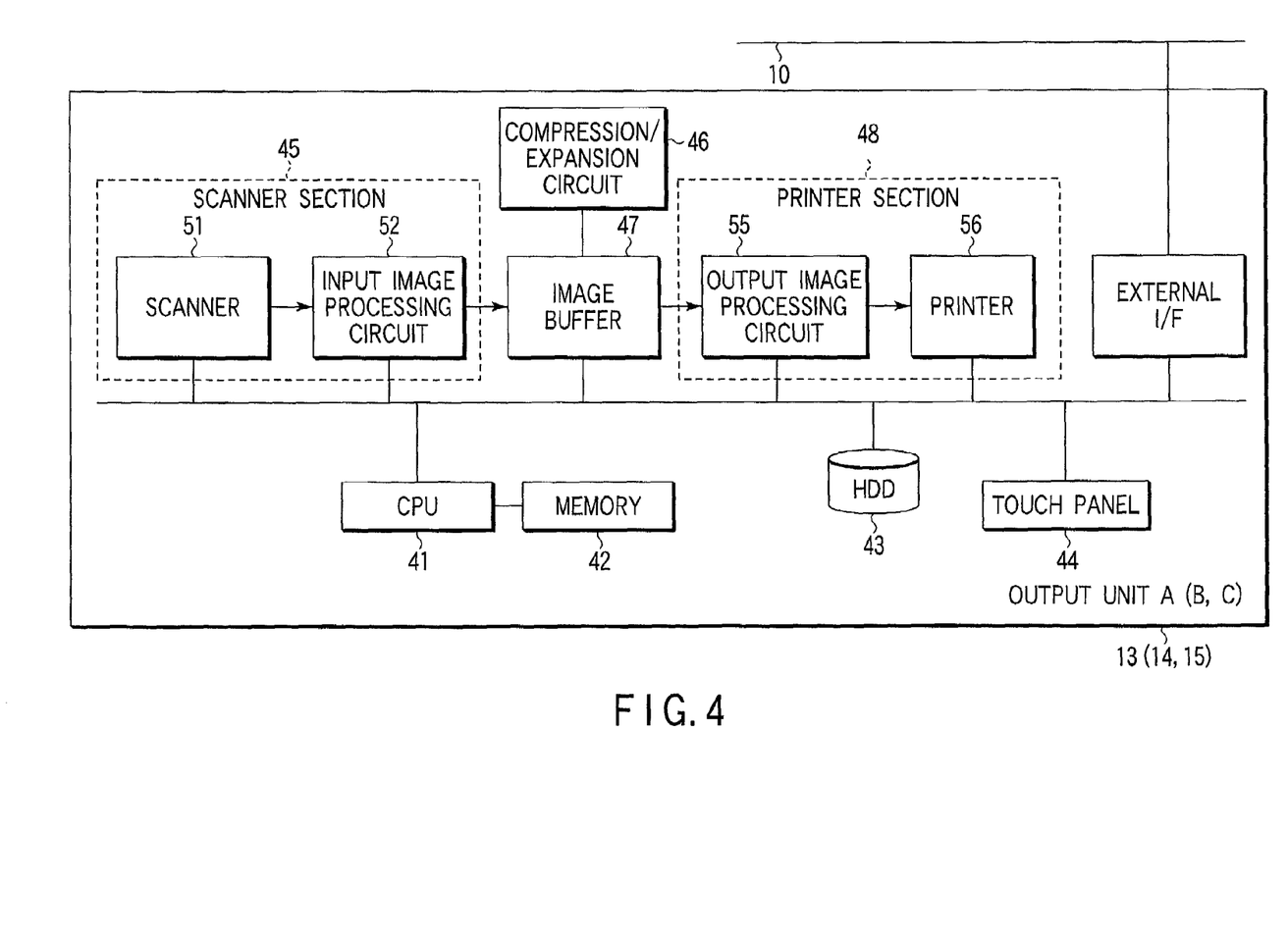
FIG. 4 is a schematic block diagram showing an output unit (image forming apparatus) of the image forming system.

FIG. 4 is a schematic block diagram of the output unit A13 (output unit B14 and output unit C15). As FIG. 4 shows, the output unit A13 (output unit B14 and output unit C15) includes a CPU 41, a memory 42, a hard disk drive (HDD) 43, a touch panel 44, a scanner section 45, a compression/expansion circuit 46, an image buffer 47, a printer section 48, and an external I/F 49.

The CPU 41 is a controller for controlling the whole of the output unit. The memory 42 stores control programs and various types of control data of the output unit. The HDD 43 functions as a storage device for storing various types of data such as image data to be printed.

The touch panel 44 serves as a user interface of the output unit. The touch panel 44 displays guidance to a user and receives data by user's operation.

The scanner section 45 optically reads an image of a document. The scanner 45 has a scanner 51 and an input image processing circuit 52. The scanner 51 optically reads an image of a document set in a document position (not shown). The circuit 52 processes the image read by the scanner 51 and supplies the processed image to the image buffer 47.

The compression/expansion circuit 46 compresses/expands image data. When image data is stored in the HDD 43, the circuit 46 compresses it. When the compressed image data is read out of the HDD 43, the circuit 46 expands it. The image buffer 47 is a memory for storing data temporarily. When image data is printed by the printer section 48 or transmitted/received to/from another device on the network 10, the image buffer 47 stores the image data temporarily.

The printer section 48 prints image on an image forming medium. The printer section 48 has an output image processing circuit 55 and a printer 56. The circuit 55 processes image data supplied from the image buffer 47. The printer 56 prints an image on the image forming medium based on the image data processed by the circuit 55.

The external I/F 49 is an interface for connecting the output units A to C with the network 10. The external I/F 49 allows each of the output units to perform data communications with another device connected to the network 10.

Figure 5:
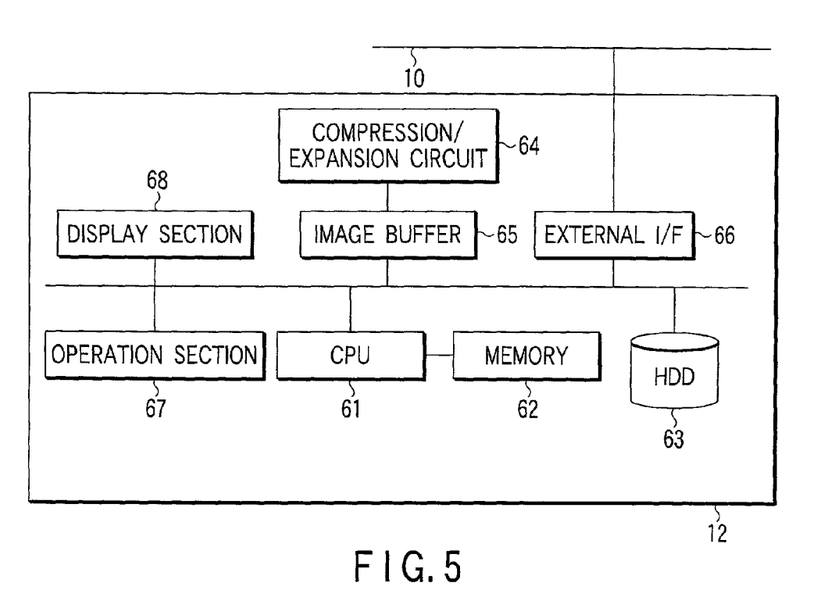
FIG. 5 is a schematic block diagram showing a terminal of the image forming system.

FIG. 5 is a schematic block diagram illustrating the terminal 12 described above. As FIG. 5 illustrates, the terminal 12 includes a CPU 61, a memory 62, a hard disk drive (HDD) 63, a compression/expansion circuit 64, an image buffer 65, an external I/F 66, an operation section 67, and a display section 68.

The CPU 61 controls the whole of the terminal 12. The memory 62 stores control programs and various types of control data of the terminal 12. The HDD 63 serves as a storage device for storing various types of data such as image data to be printed. The compression/expansion circuit 34 compresses/expands image data. When image data is stored in the HDD 63, the circuit 64 compresses it. When the compressed image data is read out of the HDD 63, the circuit 64 expands it. The image buffer 65 is a memory for storing data temporarily. When image data is transmitted/received to/from another device on the network 10, the image buffer 65 stores the image data temporarily. The external I/F 66 is an interface for connecting the terminal 12 with the network 10. The external I/F 66 allows the terminal 12 to perform data communications with another device connected to the network 10.

The operation section 67 is constituted of a keyboard, a mouse and the like. The operation section 67 enables a user to give an instruction to execute a print job. The display section 68 displays image data temporarily stored in the image buffer 65. The display section 68 also displays an operation screen and a guidance screen for indicating an operation sate of each of the output units on the network.

Figure 6:
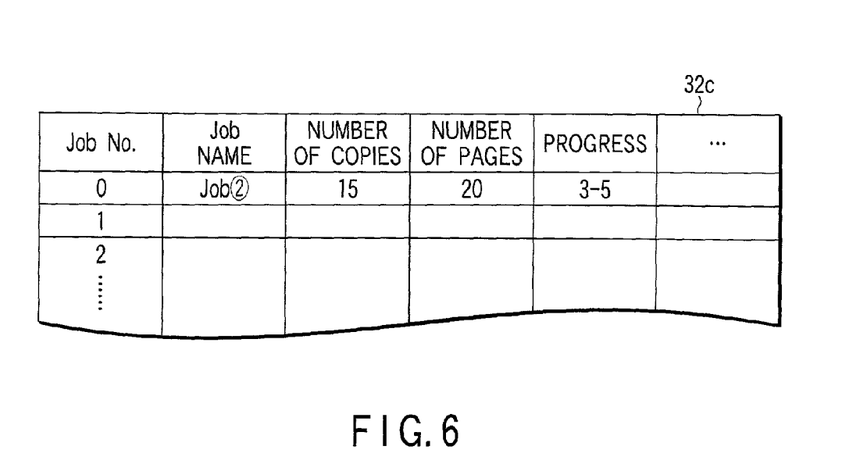
FIG. 6 is a table of job management of the output unit controlled by the controller.

FIG. 6 shows one of the job management tables 32a, 32b and 32c stored in the memory 32 of the controller 11. It is the job management table 32c of the output unit C15 that is shown in FIG. 6. The other job management tables 32a and 32b have the same constituents as those of the job management table 32c shown in FIG. 6, in order to manage the operation states of the output units A13 and B14, respectively.

As FIG. 6 shows, the job management table 32c provides items to be managed, such as a job number, a job name, the number of copies, the number of pages, and the progress.

The item of the job number manages serial numbers of a print job under execution and a print job in a wait state. Job number "0" indicates the print job under execution. The item of the job name manages a name for identifying a print job. The item of the number of copies manages the number of copies to be printed as a print job. The item of the number of pages manages the number of pages of an image to be printed. The item of the progress manages the progress of a print job.

The example of FIG. 6 shows that the output unit C15 is executing (printing) a job named as "JOB②" as a print job with a job number "0". In the job named as "JOB②", the number of copies is 15 and the number of pages is 20. The example also shows that the output unit C15 is printing page 15 of the third copy of the job named as "JOB②".

A schedule to execute a tandem print job will now be described.

Figure 7:
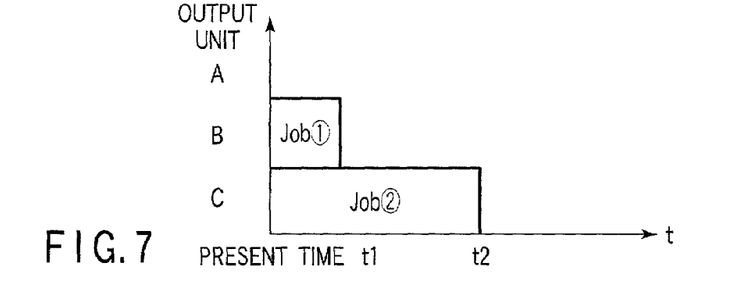
FIG. 7 is a chart showing an example of a schedule of print jobs.

FIG. 7 shows an example of a schedule to execute a job of each of the output units A, B and C of the image forming system 1.

In the example of FIG. 7, when the controller 11 receives a tandem print job, the output unit A is in a wait state, the output unit B is executing "JOB①", and the output unit C is executing "JOB②". The "JOB①" executed by the output unit B is scheduled to terminate in a time period of t1. The "JOB②" executed by the output unit C is scheduled to terminate in a time period of t2 that is longer than the time period of t1.

Figure 8:
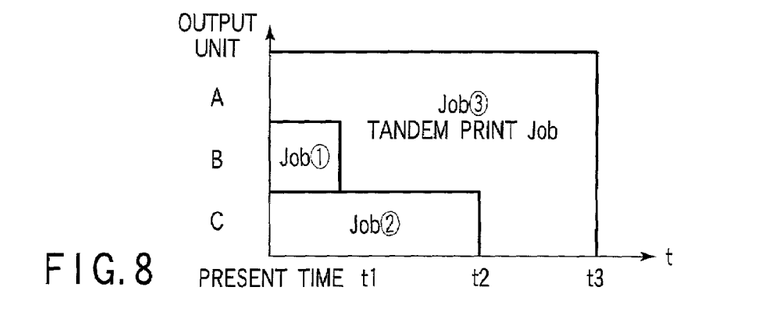
FIG. 8 is a chart showing an example of a schedule of print jobs including a tandem print job.

FIG. 8 shows an example of a schedule to execute a tandem print job "JOB③" in the image forming system in the state as shown in FIG. 7.

More specifically, when the image forming system receives the tandem print job "JOB③" in the state as shown in FIG. 7, the controller 11 draws up a schedule that allows the "JOB③" to be completed in the shortest time. In the example of FIG. 7, the output unit A can execute a print job at once, the output unit B can execute a print job in a time period of t1, and the output unit C can execute a print job in a time period of t2.

If, therefore, only the output unit A can complete the "JOB③" within a time period of t1, the controller 11 assigns the "JOB③" only to the output unit A to complete it in the shortest time.

If it takes longer than the time period of t1 to complete the "JOB③" using only the output unit A, the controller 11 distributes part of "JOB③" to the output unit B or C. Since the output unit B finishes the job earlier than the output unit C, the controller 11 distributes the part of "JOB③" to the output unit B in a time period of t1 such that the output units A and B execute the "JOB③" simultaneously. If, in this case, the execution of "JOB③" is completed within a time period of t2, the "JOB③" can be done in the shortest time by assigning it to the output units A and B.

If it takes longer than the time period of t2 to complete the "JOB③" using both the output units A and B, the controller 11 distributes part of "JOB③" to the output unit C, too. More specifically, the controller 11 distributes part of "JOB③" to the output unit B in a time period of t1 such that the output units A and B can execute the job simultaneously, and distributes part of "JOB③" to the output unit C in a time period of t2. If, therefore, the "JOB③" is distributed to the output units A, B and C, its execution can be completed within the shortest time period of t3.

In the example shown in FIG. 8, the "JOB③" is completed within the shortest time period of t3 if it is distributed to the output units A, B and C.

Assuming that the output capabilities (print speed per sheet) of the output units A, B and C to output the "JOB③" are Pa, Pb and Pc, respectively and the total number of outputs (the number of prints) of "JOB③" is N, the shortest time t3 is expressed by the following equation:

$$t3 = \{N - Pa \cdot t1 - (Pa+Pb)(t2-t1)\}/(Pa+Pb+Pc) + t2$$

The controller 11 determines operation states of the output units A, B and C in the image forming system based on the job management tables 32a, 32b and 32c, respectively when it receives a tandem print job. By this determination, the controller 11 determines the estimated time of ending a print job under execution and that of a reserved print job. Based on this determination, the controller 11 draws up a schedule to complete the tandem print job in the shortest time. Consequently, the controller 11 can prepare a schedule that allows the tandem print job to be completed in the shortest time.

Figure 9:
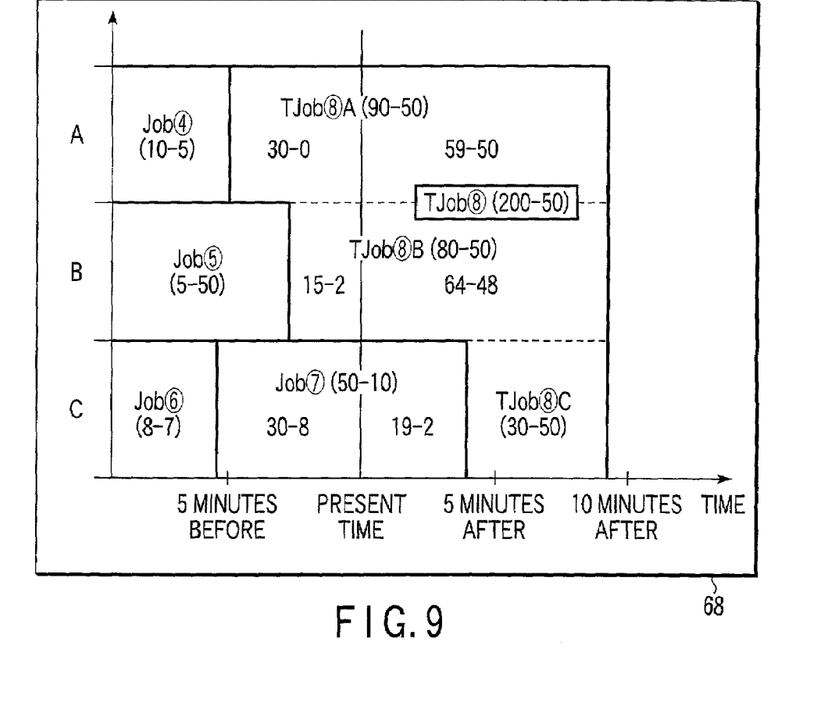
FIG. 9 is a chart showing an example of display of a schedule of print jobs.

FIG. 9 is a chart showing an example of display of a schedule of print jobs. FIG. 9 shows a schedule of print jobs and the progress of the schedule.

The schedule as shown in FIG. 9 is displayed on the display section 68 of the terminal 12 or the touch panel 44 of each of the output units A, B and C. When a user designates a tandem print job from the terminal 12, the progress of the schedule is displayed on the display section 68 of the terminal 12. When the user designates a tandem print job from each of the output units A, B and C, the progress of the schedule is displayed on the touch panel 44 of the output unit. In the example shown in FIG. 9, the schedule of a tandem print job is displayed on the display section 68 of the terminal 12.

FIG. 9 shows single print jobs "JOB④", "JOB⑤", "JOB⑥" and "JOB⑦" and a tandem print job "TJOB⑧" that are executed in the image forming system.

The single print job "JOB④" is designed for printing 10 copies of a 5-page image. The single print job "JOB⑤" is used for printing 5 copies of a 50-page image. The single print job "JOB⑥" is used for printing 8 copies of a 7-page image. The single print job "JOB⑦" is designed for printing 50 copies of a 10-page image. The tandem print job "TJOB⑧" is used for printing 200 copies of a 50-page image. The controller 11 receives these print jobs "JOB④", "JOB⑤", "JOB⑥", "JOB⑦" and "TJOB⑧" in that order.

According to the schedule shown in FIG. 9, the output unit A executes the single print job "JOB④" and then the tandem print job. The output unit B executes the single print job "JOB⑤" and then the tandem print job "TJOB⑧". The output unit C executes the single print jobs "JOB⑥" and "JOB⑦" and then the tandem print job "TJOB⑧".

In the schedule of FIG. 9, when the output unit A completes the single print job "JOB④", only the output unit A can execute the tandem print job "TJOB⑧". In this case, the controller 11 determines operation states of the output units B and C other than the output unit A based on the job management tables 32b and 32c, respectively and makes a schedule of the tandem print job "TJOB⑧".

According to the schedule of FIG. 9, when the output unit A completes the job "JOB④", the output unit B is executing the job "JOB⑤". When the output unit A completes the job "JOB④", the output unit C is executing the job "JOB⑥" and the job "JOB⑦" is reserved.

The tandem print job "TJOB⑧" is distributed to print jobs "TJOB⑧A", "TJOB⑧B" and "TJOB⑧C" and these print jobs are assigned to the output units A, B and C, respectively. As FIG. 9 shows, the print job "TJOB⑧A" is assigned to the output unit A and designed for printing 90 copies of the 50-page image, the print job "TJOB⑧B" is assigned to the output unit B and designed for printing 80 copies of the 50-page image, and the print job "TJOB⑧C" is assigned to the output unit C and designed for printing 30 copies of the 50-page image. 200 copies of the 50-page image can thus be printed by the print jobs "TJOB⑧A", "TJOB⑧B" and "TJOB⑧C" of the tandem print job "TJOB⑧".

The progress of the schedule is displayed by the dotted lines as shown in FIG. 9. The progress of the schedule corresponds to the operation states of the respective output units. In the example of FIG. 9, the output unit A completes printing 30 copies for the print job "TJOB⑧A" and has not printed remaining 59 copies and 50 pages. The output unit B completes printing 15 copies and 2 pages for the print job "TJOB⑧B" and has not printed remaining 64 copies and 48 pages. The output unit C does not start the print job "TJOB⑧C", but completes 30 copies and 8 pages for the print job "JOB⑦" and has not printed remaining 19 copies and 2 pages.

As described above, the controller 11 controls the respective output units according to the schedule upon receiving a tandem print job. During the execution of the tandem print job, the display section 68 of the terminal 12 or the touch panel 44 of each of the output units A, B and C displays the schedule of the print job of the output unit and the progress of the schedule. Thus, a user can confirm the schedule of the tandem print job and the progress of the schedule.

An operation of the image forming system to execute a tandem print job will be described below.

Figure 10:
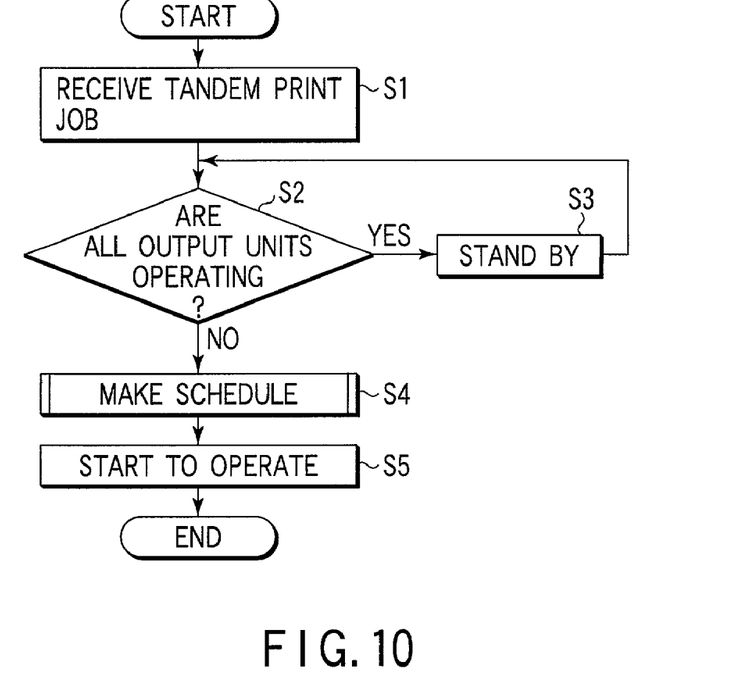
FIG. 10 is a flowchart explaining a process executed when a tandem print job is received.

FIG. 10 is a flowchart explaining an operation of the image forming system to execute a tandem print job.

First, the controller 11 receives a tandem print job (step S1). Then, the CPU 31 checks the states of the output units A, B and C based on their respective job management tables 32a, 32b and 32c in the memory 32. As a result of the check, the CPU 31 determines whether the output units A, B and C are all operating or not (step S2). If the CPU 31 determines that the output units A, B and C are all operating, it stands by until the output units A, B and C change in their states.

Assume that any of the output units A, B and C changes into a printable state. The CPU 31 determines that any of the output units changes into a printable state based on the variations in the states of the job management tables 32a, 32b and 32c. The CPU 31 thus makes a schedule to execute the received tandem print job within the shortest time (step S4). In this schedule, the tandem print job is distributed and assigned to the output units A, B and C in accordance with the operation states thereof. The CPU 31 supplies print jobs to the output units A, B and C based on the schedule.

The print jobs supplied to the output units A, B and C are those obtained by distributing the tandem print job and constituted of image data to be printed and control data indicative of the number of copies. The output units A, B and C start their printing operations corresponding to the print jobs supplied thereto (step S5). As a result, the image forming system can complete the tandem print job within the shortest time as a whole.

In step S4, when at least one output unit changes into a printable state, the CPU 31 (controller 11) makes a schedule to execute the tandem print job. However, the CPU 31 can make a schedule in accordance with the operation states of the respective output units when the controller 11 receives the tandem print job.

As described above, the controller 11 makes a schedule of the tandem print job when at least one output unit changes in a printable state. This schedule is prepared such that the tandem print job can be completed within the shortest time by assigning the tandem print job to an output unit under execution of another print job. The controller 11 causes all available output units to execute the print jobs according to the above schedule.

If, therefore, at least one of the output units changes into a printable state, it can start the tandem print job. When the tandem print job is started, it can be assigned to an output unit under execution of another print job, thereby completing the tandem print job within the shortest time.

A user's operation of designating time required to complete printing for a tandem print job, will now be discussed.

Figure 11:
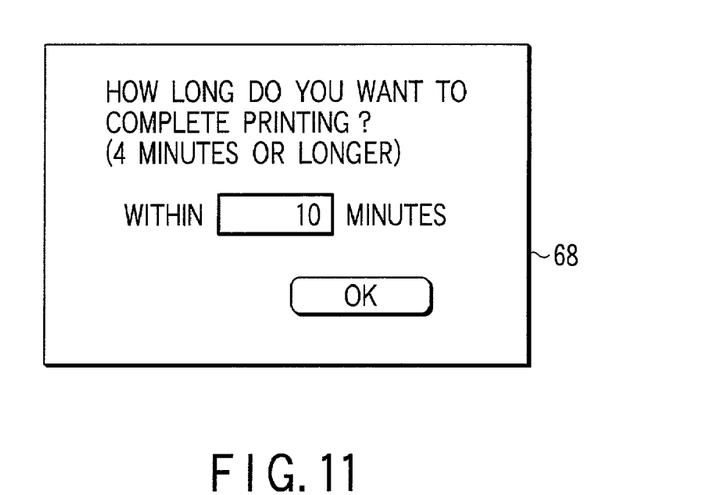
FIG. 11 is a view showing an example of designated ending time.

FIG. 11 shows an example of a time-setting screen in which a user designates an allowable range of time required to complete printing for a tandem print job. This screen is displayed on the display section 68 of the terminal 12 or the touch panel 44 of each of the output units A, B and C. When the user designates the tandem print job from the terminal 12, the above screen is displayed on the display section 68. When the user designates it from the output units A, B and C, the screen is displayed on the touch panel 44.

Figure 12:
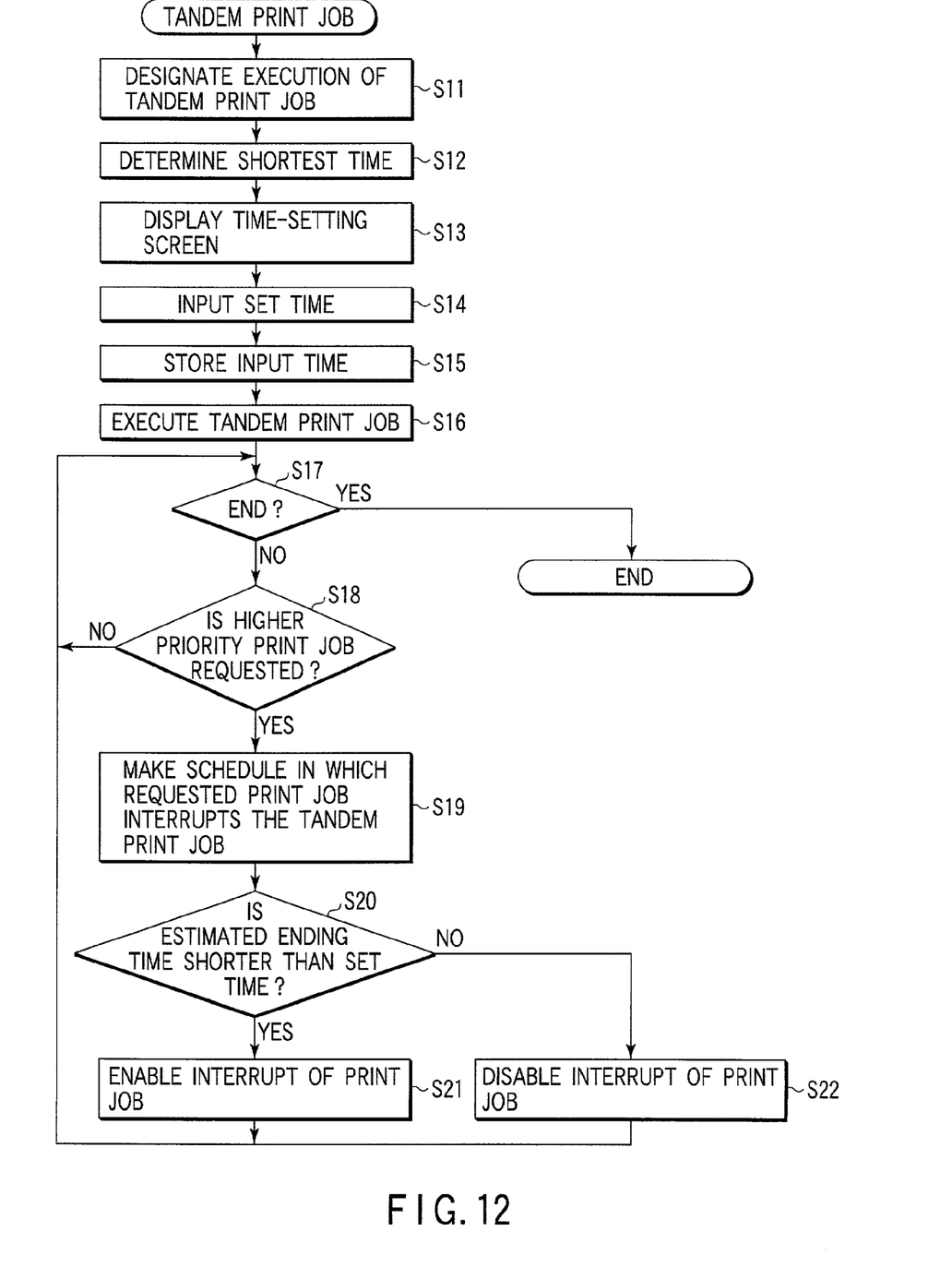
FIG. 12 is a flowchart explaining an operation of controlling an interrupt of a job based on the designated ending time.

The case where a user designates a tandem print job from the terminal 12 and a time-setting screen as shown in FIG. 11 is displayed on the display section 68 of the terminal 12, will now be described with reference to the flowchart illustrated in FIG. 12.

First, the user instructs the controller 11 to execute a tandem print job from the terminal 12 (step S11). Then, the terminal 12 notifies the controller 11 of the user's instruction to execute the tandem print job.

The controller 11 determines the shortest time required to complete the tandem print job based on the current operation states of the output units A, B and C and the contents of the tandem print job (step S12). If the controller 11 determines the shortest time, it notifies the terminal 12, which is the originator of the tandem print job, of the shortest time.

Based on the notification from the controller 11, the terminal 12 displays the time-setting screen on the display section 68 as shown in FIG. 11 (step S13). The screen shows a question "How long do you want to complete printing?" and the shortest time determined by the controller 11. For example, the shortest time is displayed like "4 minutes or longer." The time-setting screen includes a display area for displaying time designated by the user and an "OK" button for confirming the designated time. The user designates time by the operation section 67 and depresses the "OK" button (step S14). Thus, the terminal 12 transmits the user's designated time to the controller 11.

The controller 11 stores the user's designated time in the memory 32 in accordance with the tandem print job (step S15). The controller 11 controls the respective output units to execute the tandem print job such that the tandem print job can be completed within the user's designated time (step S16).

During the execution of the tandem print job (step S17, NO), the controller 11 monitors the presence or absence of an interrupt request of a print job (step S18). For example, the controller 11 determines the presence or absence of an interrupt request of a print job in accordance with the priority of the print job. When the controller 11 determines the presence of an interrupt request of a print job (step S18, YES), it draws up a schedule in which the print job interrupts the tandem print job under execution (step S19).

Based on the schedule, the controller 11 determines the time of ending the tandem print job. The controller 11 compares the time of ending the tandem print job that a higher priority print job interrupts and the user's designated time stored in the memory 32 (step S20).

If the above ending time of the tandem print job is shorter than the user's designated time, the controller 11 enables the interrupt of the print job (step S21). When the controller 11 enables the interrupt, it changes the schedule of the tandem print job to a schedule in which the higher priority print job interrupts the tandem print job.

If the ending time of the tandem print job is equal to or longer than the user's designated time, the controller 11 disables the interrupt of the print job (step S22). When the controller 11 disables the interrupt, it does not receive the requested higher priority print job. In this case, the controller 11 continues to execute the tandem print job without changing its schedule.

As described above, the user sets the ending time of the tandem print job. When a higher priority print job is requested during the execution of the tandem print job, and the tandem print job is completed within the set time, the controller causes the higher priority print job to interrupt the tandem print job. If the tandem print job is not completed within the set time, the controller does not receive the higher priority print job.

Thus, the tandem print job can reliably be completed within the user's designated time, and another print job can be caused to interrupt the tandem print job within the designated time.

A process of presenting information on the tandem print job to a user will now be described.

The information on the tandem print job is displayed on the display section 68 of the terminal 12 or the touch panel 44 of each of the output units A, B and C. When a user designates the tandem print job from the terminal 12, the schedule of the tandem print job is displayed on the display section 68 of the terminal 12. When the user designates the tandem print job from the output unit A, the schedule is displayed on the touch panel 44 of the output unit A.

Figure 13:
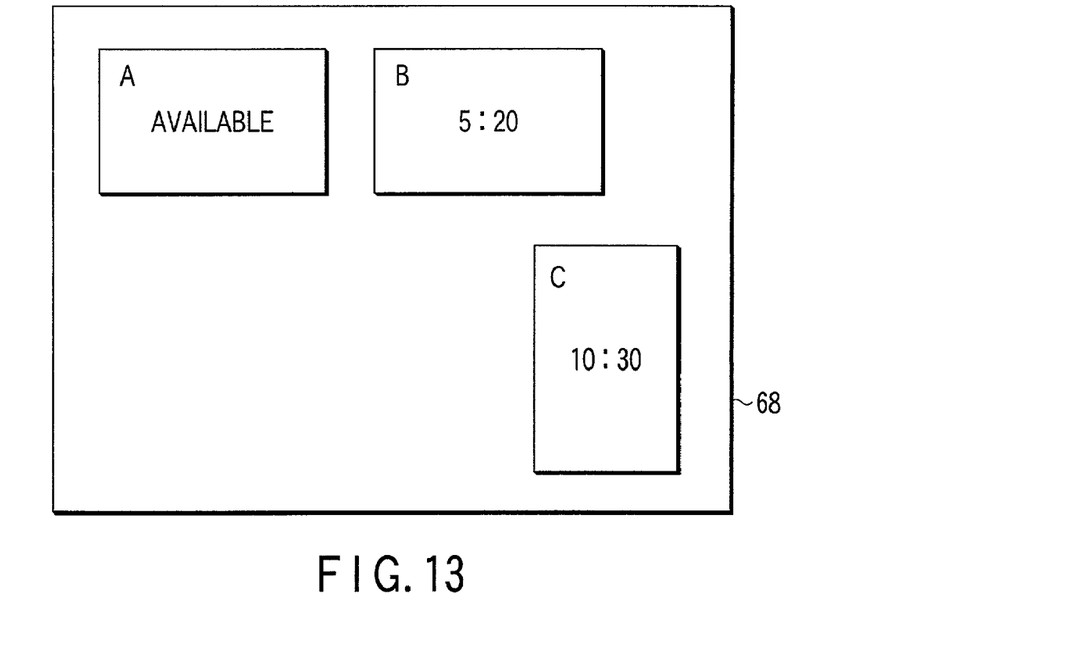
FIG. 13 is a view showing the layout of the output units and the current job states.

FIG. 13 shows an example of the display of an operation state of each of the output units on the display section 68 when the user designates the tandem print job from the terminal 12.

When the user designates the execution of the tandem print job by the operation section 67 of the terminal 12, the controller 11 reads the management tables 32a, 32b and 32c and determines the operation states of the output units A, B and C. By this determination, the controller 11 notifies the terminal 12 of the operation states of the output units A, B and C. Based on the notification from the controller 11, the terminal 12 displays the operation states of the output units A, B and C on the display section 68.

In the example shown in FIG. 13, the output unit A stands by, the output unit B is scheduled to complete a job under execution in 5 minutes and 20 seconds, and the output unit C is scheduled to complete a job under execution in 10 minutes and 30 seconds. In the example of FIG. 13, the output units A, B and C are displayed such that one can easily imagine the actual screen layout of the output units A, B and C.

The user can know the operation states and the screen layout of the output units that allow the tandem print job to be executed.

Figure 14:
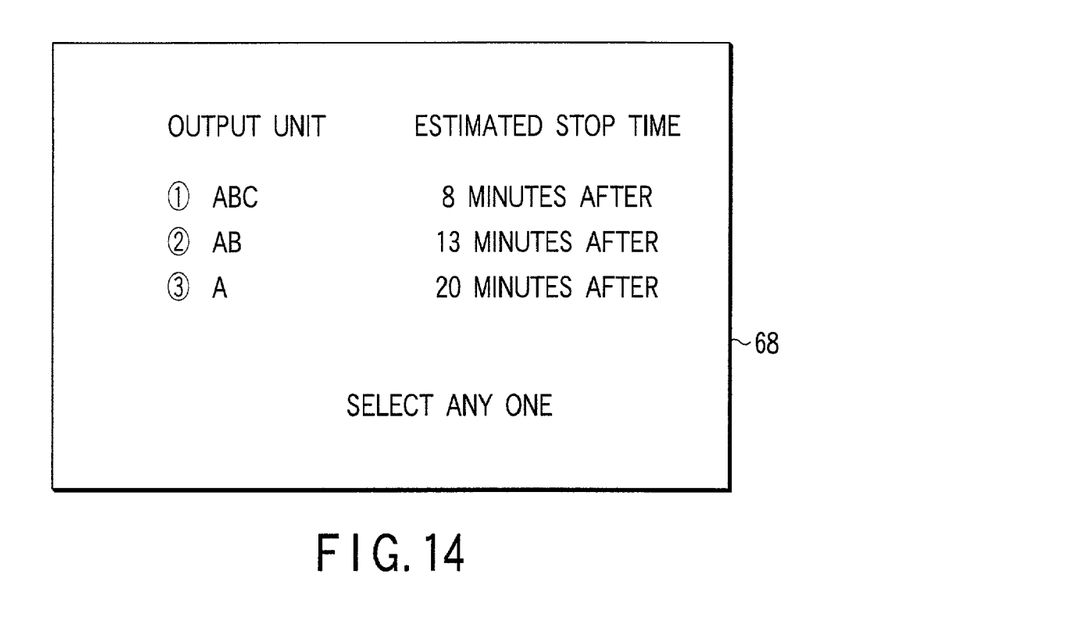
FIG. 14 is a view showing an example of display of the output units and their corresponding estimated ending time.

FIG. 14 shows a display example of a select screen on which a user selects an output unit or output units to execute the tandem print job.

If the user designates the execution of the tandem print job by the operation section 67 of the terminal 12, the terminal 12 notifies the controller 11 of the contents of the tandem print job. The controller 11 reads the management tables 32a, 32b and 32c corresponding to the output units A, B and C and determines available output units. The controller also determines a combination of the available output units and calculates the ending time of the tandem print job that corresponds to the combination. After that, the controller 11 notifies the terminal 12 of the combination of the output units and the estimated ending time of the tandem print job.

On receipt of the notification from the controller 11, the terminal 12 displays the combination and the estimated ending time on the display section 68. On the select screen shown in FIG. 14, the user can select a combination of output units that enables the tandem print job to be executed. When the user designates the combination from the select screen of FIG. 14, the terminal 12 notifies the controller 11 of the designated combination. The controller 11 makes a schedule based on the designated combination and causes the output units to execute the tandem print job.

On the select screen shown in FIG. 14, the user can select one from among options "① ABC" (output units A, B and C), "② AB" (output units A and B), and "③ A" (only output unit A). The user can also know the estimated ending time of the tandem print job that corresponds to each of the above options. More specifically, in the example of FIG. 14, the estimated ending time is 8 minutes after in the option "① ABC", and it is 13 minutes after in the option "② AB" and it is 20 minutes after in the option "③ A". The user therefore selects one from the options, referring to the estimated ending time.

As described above, when the user designates the execution of the tandem print job, the options to select the available output unit or units are displayed on the select screen. The estimated ending time of the tandem print job, which corresponds to each of the options, is also displayed thereon.

The user can easily select a single output unit or a combination of output units to execute the tandem print job with reference to the estimated ending time corresponding thereto.

An operation of causing a user to designate the execution of a higher priority print job that is required during the execution of the tandem print job will now be described.

The priority of a print job is determined by the controller 11 based on the preset criterion. For example, the priority of the contents of print jobs is stored in the memory 32. When the CPU 31 of the controller 11 receives a print job, the controller 11 determines the priority of the print job.

Figure 15:
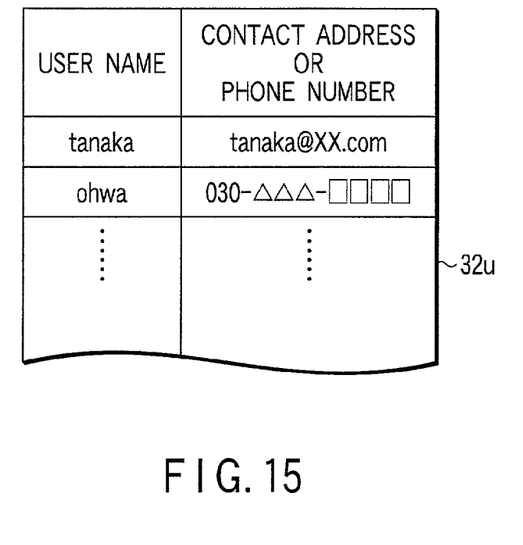
FIG. 15 is a table of user information management.

FIG. 15 shows an example of the user information table 32u. This table includes items of user name and contact address or phone number. The item of user name stores user names.

The user names are information for identifying a user or a device that designates the execution of a tandem print job. If the tandem print job is managed by the full name of a user, the full name is used as a user name. If the tandem print job is managed by a device such as the terminal 12 and the output units A, B and C, the name of the device is used as a user name.

The item of contact address or phone number stores contact addresses or phone numbers corresponding to the user names stored in the item of user name. The contact addresses or phone numbers are information representing a device for displaying a change in the tandem print job. If a user name is stored as the full name of a user, the terminal 12 corresponding to the user is stored as contact information. If a user name is stored as the name of a device, the address of the device can be stored as contact information.

Figure 16:
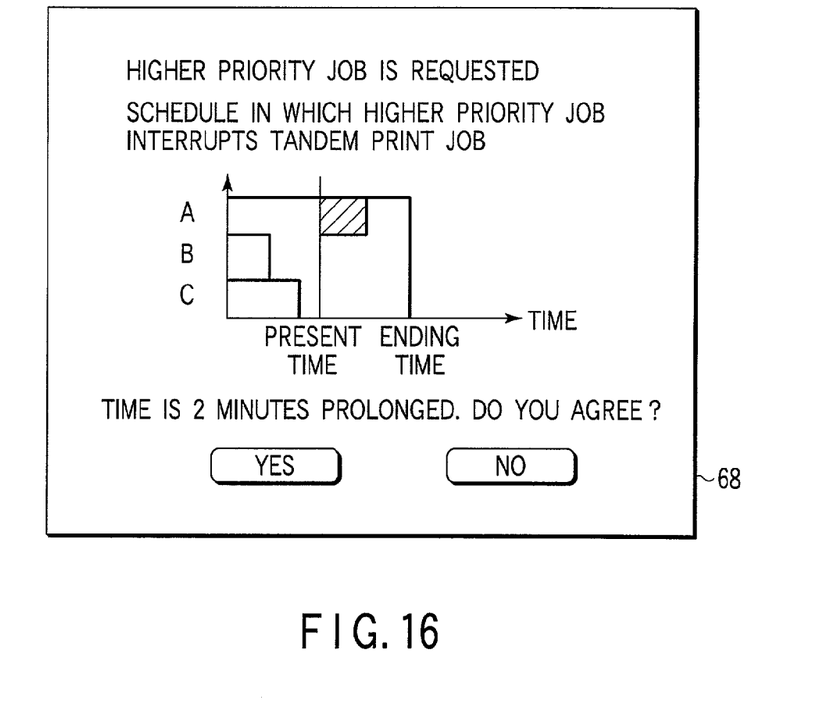
FIG. 16 is a view showing a display example of a select screen on which a user determines whether an interrupt of a higher priority job is enabled or not when the interrupt is requested.

FIG. 16 shows a display example of a select screen on which a user determines whether an interrupt of a higher priority print job is enabled or not when the interrupt is required during the execution of a tandem print job.

In the example of FIG. 16, a contact address or phone number corresponding to a user name that designates the execution of a tandem print job based on the user information table 32u is displayed. This user name is stored in the memory when the tandem print job is received. If a user designates the tandem print job from the terminal 12, a schedule of the tandem print job is displayed on the display section 68 of the terminal 12. If the user designates the tandem print job from the output unit A, the schedule thereof is displayed on the touch panel 44 of the output unit A.

In the example shown in FIG. 16, a select screen is displayed on the display section 68 of the terminal 12.

As shown in FIG. 16, the select screen displays a schedule in which a print job interrupts the tandem print job, an operating procedure, estimated time of ending the tandem print job, YES and NO buttons, and the like. The schedule is displayed by the chart showing a relationship between time and a job to be executed by each of the output units. The operating procedure is displayed as the following information: "Higher priority job is requested."

The estimated time is displayed as a time period by which it is prolonged when a print job interrupts the tandem print job. If the time is two minutes prolonged by the interrupt of a print job, the screen displays the following information: "Ending time is two minutes prolonged. Do you agree?" A user depresses the YES button when he or she permits the interrupt or a change of the schedule. The user depresses the NO button when he or she does not permit the interrupt or a change of the schedule.

Confirming the schedule and a delay in the ending time displayed on the above select screen, a user selects the YES button when he or she permits the interrupt of a print job and selects the NO button when he or she does not do it.

Figure 17:
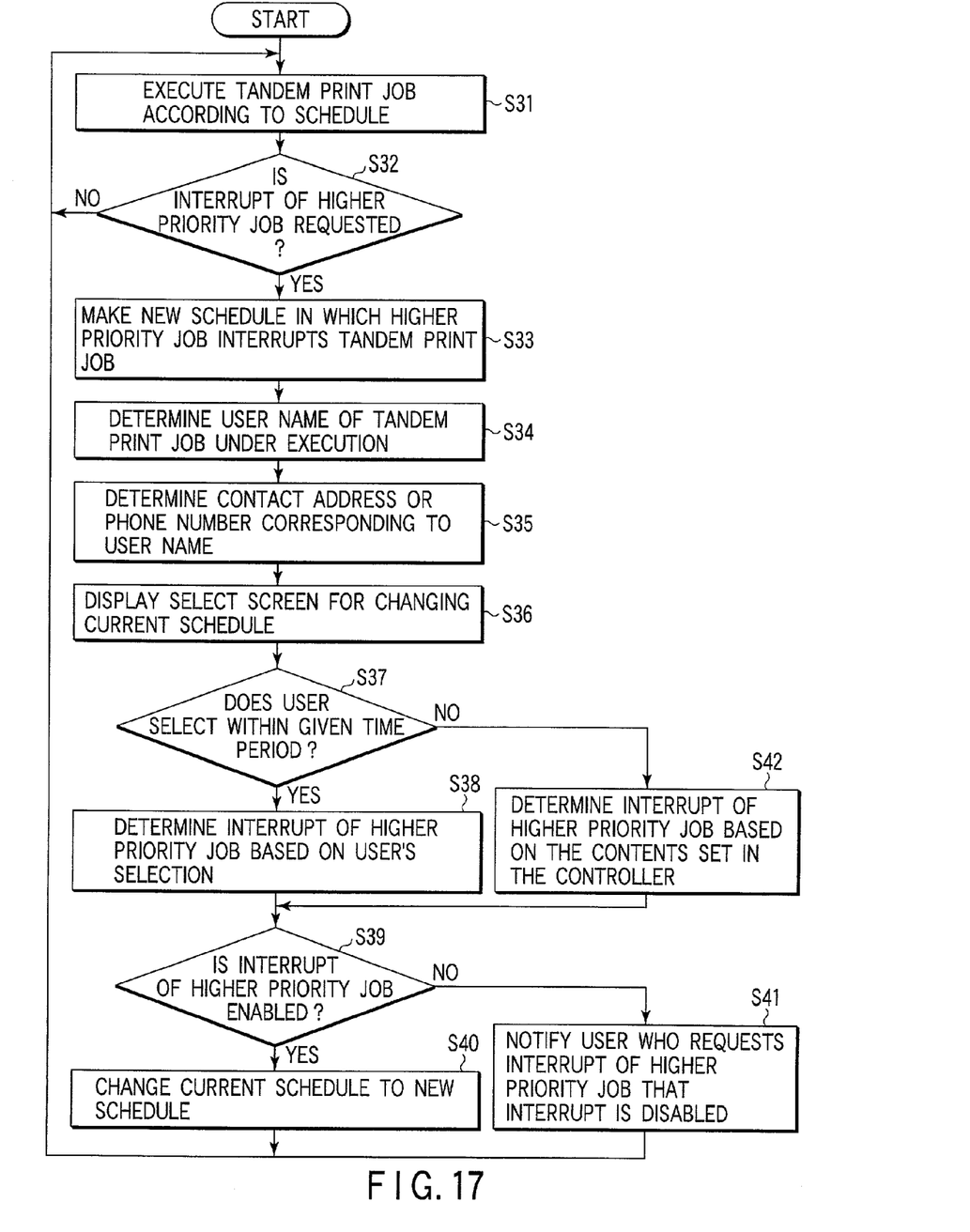
FIG. 17 is a flowchart explaining an operation of the image forming system that is performed when a higher priority job is requested.

FIG. 17 is a flowchart showing a process of determining whether a user permits an interrupt of a print job. In this process, the user designates a tandem print job from the terminal 12.

First, the controller 11 allows the output units to execute the tandem print job according to a schedule of the tandem print job (step S31). During the execution of the tandem print job, the controller 11 receives a request of an interrupt of a print job (priority job) having higher priority than that of the tandem print job (step S32). Then, the controller 11 prepares a new schedule by incorporating the priority job into the current schedule (step S33). After that, the controller 11 determines the name of a user that designates the execution of the tandem print job. Based on the user information table 32u, the controller 11 determines a contact address or phone number corresponding to the user name (step S34). Then, the controller 11 transmits data representing the new schedule prepared in step S33 to the terminal 12. The display section 68 of the terminal 12 displays the above new schedule transmitted from the controller 11. The display section 68 also displays information "Higher priority job is requested," time by which the time of ending the tandem print job is prolonged, and YES and NO buttons. The YES button is selected when a change of the schedule is permitted, while the NO button is selected when it is not permitted.

The controller 11 waits for user's selection between the YES and NO buttons. If the user depresses one of the buttons on the select screen within a given time period (step S37, YES), the controller 11 determines whether the interrupt is enabled or disabled in accordance with the user's selection (step S38).

If the user selects the YES button from the select screen, the terminal 12 notifies the controller 11 that the interrupt of the priority job is enabled. Then, the controller 11 changes the schedule under execution to the new schedule prepared in step S33. In the image forming system, therefore, the priority job is executed on a higher priority basis than the tandem print job in accordance with the user's selection.

If the user selects the NO button from the select screen, the terminal 12 notifies the controller 11 that the interrupt of the priority job is disabled. Then, the controller 11 determines that the interrupt is disabled (step S39, NO) and continues to execute the tandem print job without changing its schedule. The controller 11 notifies the originator of the priority job that it cannot receive the priority job because of the tandem print job under execution (step S41). In this case, the controller 11 can notify the originator of the time required until the priority job can be executed according to the current schedule. Thus, the tandem print job can be executed without any interrupt of the priority job in accordance with the user's selection.

In step S39, the controller 11 determines whether the schedule can be changed in accordance with the contents present in the controller 11 when the user does not select one of the buttons within a given period of time. Whether to cause an interrupt of the priority job is set in the controller 11 in this case.

More specifically, when the user does not select any button from the select screen within a predetermined time period, the controller 11 determines whether an interrupt of the priority job is enabled or disabled based on the contents set in the controller 11 (step S42). The controller 11 advances to step 39 and performs an operation of enabling or disabling the interrupt based on a result of the determination.

If the controller 11 is preset so as to enable an interrupt of the priority job and the user does not select any button within a given period of time, the controller 11 automatically changes the schedule to cause the interrupt of the priority job. Thus, the priority job can be executed by priority even when the user leaves the system after the tandem print job starts.

If the controller 11 is preset so as to disable an interrupt of the priority job and the user does not select any button within a given period of time, the controller 11 continues to execute the tandem print job without changing the current schedule thereof. Thus, the tandem print job can be completed as scheduled without any interrupt of another job even when the user leaves the system after the tandem print job starts.

As described above, a schedule of a job other than the tandem print job executed by the output units and that of the tandem print job are prepared when tandem print is performed. In the image forming system, the tandem print job is executed according to the prepared schedules. Thus, the job of the tandem print can dynamically assigned to a plurality of output units. In other words, even when only one output unit is available, the tandem print can be started, and the other output units can be used for the tandem print whenever they are available.

Moreover, the printing schedules of the plural output units are displayed as a graph showing a relationship between time and processing of the output units. The image forming system of the present invention includes a means for presenting the progress of printing including tandem printing in the output units and the estimated ending time of the tandem printing to a user. The data can thus easily be shown to the user in a visual form. Consequently, the user can easily understand when the tandem printing is completed, which output unit is used, how many copies are printed, and what image is copied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus of an image forming system, the control apparatus comprising:
   an interface which performs data communications with another device connected to a network;
   a management table which manages an operation state of each of image forming apparatuses connected to the network; and
   a controller which, when a printing request for a tandem print job that corresponds to one print job that is distributed to the image forming apparatuses to complete the one print job, is received, prepares a schedule in which the tandem print job is distributed to the image forming apparatuses connected to the network based on the operation state of each of the image forming apparatuses, and transmits a content of the printing that is executed by each of the image forming apparatuses according to the schedule, wherein one of the plurality of image forming apparatuses includes the control apparatus, and the image forming apparatus including the control apparatus serves as a master apparatus, while the image forming apparatuses other than the master apparatus serve as slave apparatuses.

2. A control apparatus of an image forming system, the control apparatus comprising:
   an interface which performs data communications with another device connected to a network;
   a management table which manages an operation state of each of image forming apparatuses connected to the network; and
   a controller which, when a printing request for a tandem print job that corresponds to one print job that is distributed to the image forming apparatuses to complete the one print job, is received, prepares a schedule in which the tandem print job is distributed to the image forming apparatuses connected to the network based on the operation state of each of the image forming apparatuses, and transmits a content of the printing that is executed by each of the image forming apparatuses according to the schedule and wherein the controller causes a user to designate the user's desired ending time of the tandem print job when the tandem print job is received, and causes another print job to interrupt the tandem print job if an estimated ending time is earlier than the desired ending time designated by the user when a printing request for the print job is received during execution of the tandem print job.

3. The control apparatus of the image forming system according to claim 2, wherein the controller causes a user to designate the user's desired ending time of the tandem print job when the tandem print job is received, and causes a print job having higher priority than that of the tandem print job to interrupt the tandem print job if an estimated ending time is earlier than the desired ending time designated by the user when a printing request for the print job having higher priority is received during execution of the tandem print job.

4. The control apparatus of the image forming system according to claim 2, wherein the controller causes a user to designate the user's desired ending time of the tandem print job when the tandem print job is received, prepares a schedule in which a print job having higher priority than that of the tandem print job interrupts the tandem print job under execution when the print job having higher priority is received, disables an interrupt of the print job having higher priority when an estimated ending time of the tandem print job according to the schedule is later than the user's desired ending time, and enables the interrupt of the print job having higher priority if the estimated ending time is earlier than the user's desired ending time, thereby executing the schedule in which the print job having higher priority interrupts the tandem print job.

5. A control apparatus of an image forming system, the control apparatus comprising:
   an interface which performs data communications with another device connected to a network;
   a management table which manages an operation state of each of image forming apparatuses connected to the network; and
   a controller which, when a printing request for a tandem print job that corresponds to one print job that is distributed to the image forming apparatuses to complete the one print job, is received, prepares a schedule in which the tandem print job is distributed to the image forming apparatuses connected to the network based on the operation state of each of the image forming apparatuses, and transmits a content of the printing that is executed by each of the image forming apparatuses according to the schedule, wherein the controller provides an originator of the tandem print job with options of combinations of image forming apparatuses to execute the tandem print job, and prepares a schedule of the tandem print job in accordance with one of the options selected by the image forming apparatuses or the external device, and wherein the controller provides estimated ending time of the tandem print job corresponding to the options of combinations.

6. The control apparatus of the image forming system according to claim 5, wherein when the controller receives a printing request for a print job having higher priority than that of the tandem print job under execution of the tandem print job, the controller changes the schedule to a schedule in which the print job having higher priority interrupts the tandem print job and notifies an originator of the tandem print job that the schedule is changed.

7. The control apparatus of the image forming system according to claim 5, wherein when the controller receives a printing request for a print job other than the tandem print job under execution of the tandem print job, the controller causes a user to decide whether to permit an interrupt of the print job and then determines whether the interrupt of the print job is enabled or disabled based on the user's decision.

8. The control apparatus of the image forming system according to claim 5, wherein when the controller receives a printing request for a print job other than the tandem print job under execution of the tandem print job, the controller causes a user to decide whether to permit an interrupt of the print job, changes a schedule under execution to a schedule that the print job interrupts when the user permits the interrupt of the print job and inhibits the print job from interrupting the schedule under execution when the user does not permit the interrupt.

9. The control apparatus of the image forming system according to claim 7, wherein when the user does not decide whether to permit an interrupt of the print job within a given time period, the controller determines whether the interrupt of the print job is enabled or disabled based on contents preset in the controller.

10. A method of controlling an image forming system, the method comprising:

preparing a schedule in which a tandem print job that corresponds to one print job that is distributed to a plurality of image forming apparatuses to complete the one print job, is distributed to the plurality of image forming apparatuses connected to a network based on an operation state of each of the image forming apparatuses when a printing request for the tandem print job is received;

transmitting a content of the printing to be executed by each of the image forming apparatuses based on the schedule, to each of the image forming apparatuses;

causing a user to designate user's desired ending time of the tandem print job when the tandem print job is received; and causing another print job to interrupt the tandem print job if an estimated ending time is earlier than the user's desired ending time when the print job is received under execution of the tandem print job.

11. The method according to claim 10, further comprising:

causing a user to decide whether to permit an interrupt of a print job other than the tandem print job when the print job is received under execution of the tandem print job; and determining whether the interrupt of the print job is enabled or disabled based on user's decision.

* * * * *